United States Patent [19]
Garden et al.

[11] Patent Number: 5,109,387
[45] Date of Patent: Apr. 28, 1992

[54] DYE LASER SYSTEM AND METHOD

[76] Inventors: Jerome M. Garden, 150 E. Huron-Suite 910, Chicago, Ill. 60611; Abnoeal D. Bakus, 4251 W. Oakton, Skokie, Ill. 60067; William D. Smeltzer, 522 N. Spring St., Elgin, Ill. 60120

[21] Appl. No.: 633,668

[22] Filed: Dec. 26, 1990

[51] Int. Cl.$^5$ .............................. H01S 3/22
[52] U.S. Cl. .............................. 372/53; 372/51; 372/54; 372/59; 372/33
[58] Field of Search ............ 372/51, 53, 54, 59, 372/33

[56] References Cited

U.S. PATENT DOCUMENTS

| | | | |
|---|---|---|---|
| 3,967,212 | 6/1976 | Dere et al. | 372/53 X |
| 4,878,224 | 10/1989 | Kuder et al. | 372/53 |
| 4,977,571 | 12/1990 | Furumoto et al. | 372/54 |

Primary Examiner—Georgia Epps
Attorney, Agent, or Firm—Willian Brinks Olds Hofer Gilson & Lione

[57] ABSTRACT

A dye laser system and method for operation thereof. The dye laser includes a laser cavity capable of lasing in response to an energy source, a circulation path for pumping a dye solution to the laser cavity, and a regeneration medium containing saturated dye solution at equilibrium with the concentration of the dye solution in the circulation path located in the circulation path so that the dye solution is regenerated by circulation through the regeneration medium. According to another aspect, there is provided a system and method for restoring dye solution degraded by use in dye laser. The system and method include a circulation path for conveying degraded dye solution to a regeneration medium containing a saturated dye solution at equilibrium with the concentration of the dye solution in the circulation path connected to the circulation path so that the dye solution in the circulation path may be regenerated by circulation through the regeneration medium.

27 Claims, 1 Drawing Sheet

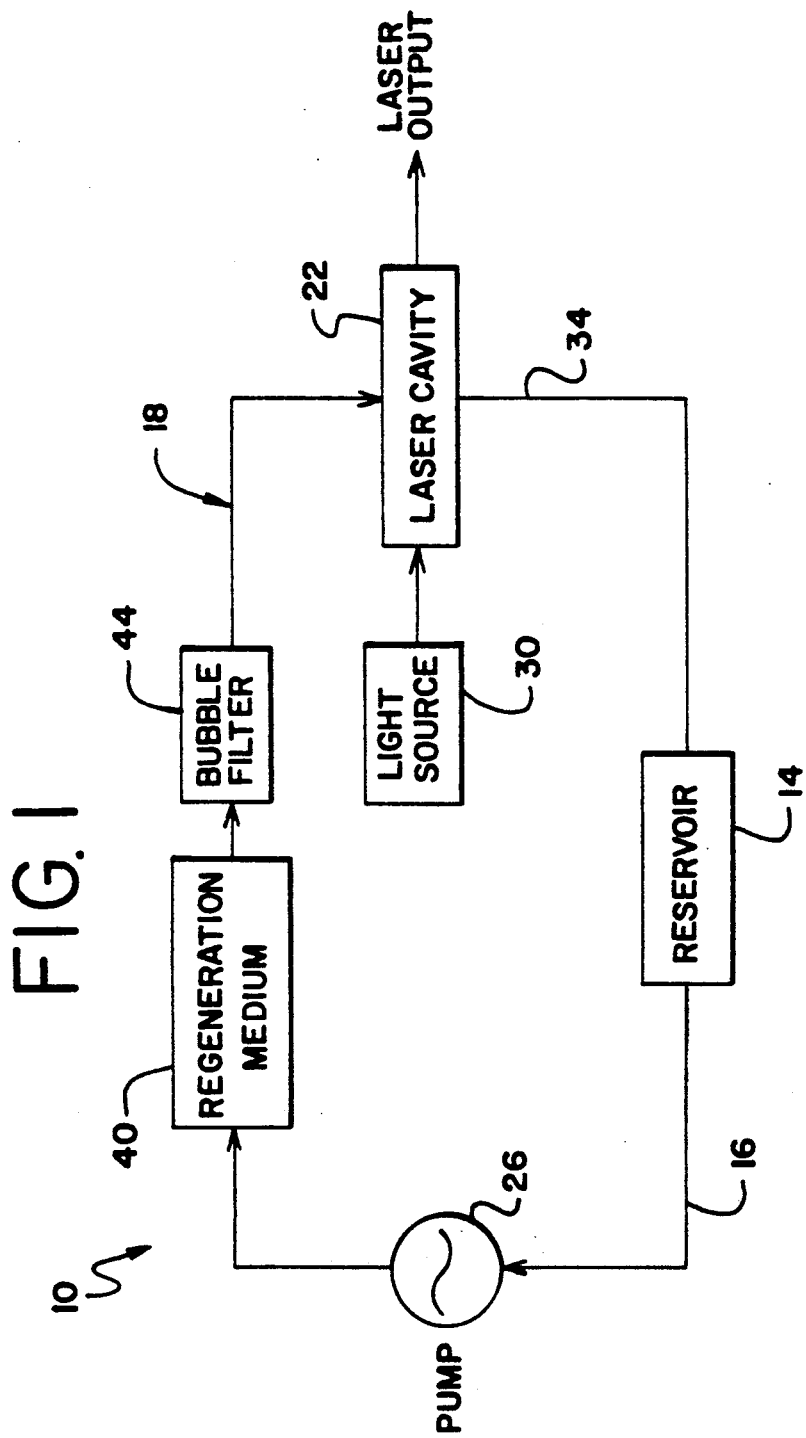

DYE LASER SYSTEM AND METHOD

BACKGROUND OF THE INVENTION

The present invention relates to an improved dye laser system and more particularly to an improved dye laser system and method for use and operation thereof that substantially improves performance and efficiency.

Dye lasers have various present applications in industrial and medical fields. Examples of medical fields in which the dye laser has proven useful are in the fields of plastic surgery, dermatology, urology, ophthalmology, etc.

Dye lasers can be tuned continuously to any wavelength in and near the visible spectrum. With the exception of the free-electron laser, that is cost and size prohibitive, dye lasers are unique with respect to tunability. All other low cost lasers operate at a single precise wavelength or at most a very few precise wavelengths. There are relatively few of these types of visible spectrum lasers so that there are large gaps in the visible spectrum that cannot be attained with nontunable lasers. Also, dye laser technology allows the output to be either pulsed or continuous at high energy output. Therefore, these features make dye lasers preferable for many applications.

Unfortunately dye lasers have a drawback that makes them unattractive for commercial use. The dye has a very limited lifespan. It degrades with use and must be replaced. This maintenance cost and inconvenience make dye lasers unsuitable for many applications, and expensive and troublesome at best.

Commercially available dye lasers use fluorescent dyes in solution as a lasing media. These lasers consist typically of (1) a laser cavity which is an optical arrangement that allows lasing to occur; (2) a dye circulation system including pumps, valves, tubing filters, a reservoir, etc., that circulates and conditions the dye solution and delivers it to the laser cavity; (3) the dye solution itself consisting of dye dissolved in a solvent or mixture of solvents as well as other chemicals that may enhance the lasing properties of the dye; and (4) an energy source capable of exciting the dye allowing it to emit and amplify light. This energy source, or pump, may be either continuous or pulsed.

An example of a commercially available dye laser, manufactured by Candela Laser Corporation, Wayland, MA. is the flash lamp pumped, pulsed dye laser. Numerous dyes may be used that lase at different wavelengths so that the entire visable spectrum may be covered. These lasers have dye reservoirs of up to approximately 20 liters. In use, the dye solution is pumped from the reservoir through a bubble filter to the laser cavity and back to the reservoir. A second reservoir can be made available since the dye in such lasers has a very short lifespan. A typical laser dye such as Rhodamine 575 in ethylene glycol water solvent has an expected lifespan of only 1000–2000 pulses in a 20 liter reservoir using 400 mg dye at output energies of 1.5 to 3 joule with the laser system at a 350 microsecond pulse duration. Throughout this lifespan the efficiency of the dye decreases, so that if a constant output energy is required, the pump energy must be adjusted to compensate for the lost efficiency. The end of useful life is determined by the energy output required. When the desired energy output cannot be maintained at the maximum input energy setting, the dye is exhausted and must be replaced. The dye and degraded dye products are removed from the solvent by passing it through an activated charcoal filter, which is initially very efficient at removing dye from solution, but must be replaced after a few dye changes because it becomes slow in removing the dye. New dye is then added to the solvent and mixed until thoroughly dissolved. This process may take an extended period of time, so that if the laser is in heavy use, changing dye is a continuous process. At the above laser's fastest repetition rate (about 1 pulse per sec) the dye would only last 33 minutes. Thus, the laser could operate at this rate for only about one hour before the laser use would have to be stopped to wait for completion of the dye changing process.

A dye laser of the above-described type has been used in dermatology and plastic surgery to treat port-wine-stains (birthmarks) and has proven to be the treatment of choice for removal. A typical treatment session of a large post-wine-stain process consists of 300 to 400 shots and takes about 45 minutes. During the course of treatment the output energy must be constantly monitored and adjusted to compensate for dye degradation. Changing dye is an ongoing process with a technician devoted to maintenance of the laser. In spite of this, the treatment schedule is frequently disrupted by maintenance.

One manufacturer, Candela Laser Corporation, has attempted to improve this situation and has developed a pulsed dye laser for dermatology and plastic surgery with an automated dye removal/replacement system that changes the dye in a small reservoir every 100–200 pulses without seriously disrupting the treatment. The dye kit for this system costs $950.00 and is good for only 5000 pulses. The energy output is constantly monitored and adjusted by another automated system. These improvements more than double the cost of the laser. The disadvantages associated with the presently available dye lasers have resulted in substantial costs of use and operation and have limited the availability of dye lasers accordingly. Therefore, it would be a significant advance if the cost of replacing the dye and solvent in a dye laser could be reduced or eliminated.

Others have attempted to extend the useful life of the dye solution in a dye laser. In U.S. Pat. No. 4,364,015, for "Compact Reservoir System For Dye Lasers", a system is disclosed that includes a by-pass loop circuit in conjunction with a main fluid circuit. The by-pass circuit disclosed in the '015 patent diverts a portion of the dye solution from the main circuit and passes the solution through a filter located in the by-pass circuit. The filter is intended to remove solute and particulate from the solvent and return the solvent to the main circuit thus eliminating the used dye from the system. A drawback of the method of the '015 patent is the necessity for the additional by-pass circuit as well as the filters associated therewith, and the eventual loss of dye with each filter pass.

Another method intended to improve operation of a dye laser system is disclosed in *Sov. J. Quantum Electron.*, Vol. 6, No. 9 (Sep. 1976). The method closed in the Soviet article includes passing a dye solution through a filter of anhydrous aluminum oxide of the analytic grade to remove undesired photoproducts. The article disclosed an extension of the life of the dye from 1 to up to 10 pulses without significant degradation. However, according to the method described, the dye was not salvaged for further use, thus still greatly limiting the application of this method.

Accordingly, it is an object of the present invention to provide a dye laser, and a method for use thereof, with a much extended dye solution lifetime.

It is another object of the invention to provide a dye laser system that dispenses with, or reduces the necessity for, periodic dye replacement.

It is another object of the invention to provide a much more efficient dye laser.

It is yet another object of the invention to provide a dye laser, and method for operation thereof, with a more consistent energy output.

It is still another object of the present invention to provide a method and system for modification of an existing dye lasers that can be retrofitted thereto to improve performance and efficiency.

It is yet still another object of the present invention to provide a method and system for restoring dye solution degraded during use in a dye laser system so that the dye solution can continue to be used in a dye laser.

SUMMARY OF THE INVENTION

According to a first aspect of the present invention, there is provided a dye laser system and a method for operation thereof. The dye laser system includes an energy source, a laser cavity capable of lasing in response to the energy source, a circulation path for pumping a dye solution to the laser cavity, and a regeneration medium, located in the circulation path, in equilibrium with the dye solution whereby the dye solution in the circulation path may be restored purified by circulation through the regeneration medium.

According to another aspect of the present invention, there is provided a system for restoring dye solution degraded by use in dye laser. The system includes a circulation path for conveying degraded dye solution to a regeneration medium containing dye in equilibrium with the dye solution and connected to the circulation path whereby the dye concentration in the circulation path may be restored by circulation through the regeneration medium.

BRIEF DESCRIPTION OF THE DRAWING

The FIGURE is a schematic depicting the dye laser system of a presently preferred embodiment of the present invention.

DETAILED DESCRIPTION OF THE PRESENTLY PREFERRED EMBODIMENTS

A first presently preferred embodiment the present invention is depicted generally in the figure. A dye laser system 10 includes a reservoir 14 that serves as a source of dye solution. The reservoir 14 is connected by a first segment 16 of a circulation path 18 to a laser cavity 22. Dye solution is drawn by a pump 26 located in the first segment 16 from the reservoir 14 and provided to the laser cavity 22. An energy source 30 is located to excite the cavity 22 to produce laser light in a manner known in the art. In response to the excitation from the energy source 30, pulsed or continuous coherent light is emitted from the laser cavity 22. The dye solution is provided to the laser cavity 22 during the excitation of the laser cavity by the energy source.

Use of the dye solution in the laser cavity 22 causes the dye solution to decompose or otherwise become unfit for use. The exact nature of the decomposition may have several aspects and may include both the production of impurities in the solvent as well as the generation of excited states of the dye molecules.

After use in the cavity 22, the dye solution is returned by another segment 34 of the circulation path 18 back to the reservoir 14.

According to the present embodiment, located in the first segment 16 of the circulation path 18 between the pump 26 and the laser cavity 22 is a regeneration medium 40. The regeneration medium 40 preferably is comprised of a filter medium, such as activated charcoal, however other materials may be suitable as well. The regeneration medium 40 has been saturated with dye, e.g. concentrated dye solution that has been drawn through the medium until the medium is no longer capable of removing dye from solution. In the present embodiment, the medium absorbed approximately 6 grams of rhodamine 575 dye before becoming saturated. Use of the regeneration medium 40 in the circulation path 18 has been found to restore the dye solution so that it can continue to be used in the dye laser. The regeneration medium is composed of a material that is capable of retaining dye in equilibrium with dye solution in the circulation path and also is capable of removing impurities and excited states of the dye molecules. The precise placement of the regeneration medium 40 in the circulation path 18 is not critical and the regeneration medium 40 may be located in the circulation path 18 on either side of the laser cavity 22.

In the presently preferred embodiment, a bubble filter 44 may optionally be located in the first segment 16 of the circulation path 18 between the regeneration medium 40 and the laser cavity 22. The bubble filter 44 is not considered to be critical and may be eliminated.

Whereas in prior dye laser systems, gradual degradation of the dye solution occurred so that after approximately 1000-2000 pulses the dye solution made with 400 mg of Rhodamine 575 dye became degraded to the extent that significant diminution of laser output resulted, in the present embodiment, use of the regeneration medium in the circulation path maintains the dye solution and enables a dye laser to operate without replacement of the dye solution. In accordance with the present embodiment, a dye laser has been found to operate with the same dye solution in excess of 400,000 pulses, without measurable degradation. With a replacement cost of the dye solution of approximately $950.00, a busy medical practice can reduce expenses by approximately $40,000-50,000 annually.

Moreover, not only can the dye laser be operated without replacement of the dye solution for a substantially greater period of time, but also, the laser can be operated at a higher output level. As mentioned above, in prior dye laser systems, the laser output with "fresh" solution may be approximately 0.5 Joules at 7 Kv; however, with the present embodiment a laser output of approximately 2.0 Joules can be obtained at 7 kV. Alternatively, the laser can be operated to provide the same energy output as in the prior devices, but with a lower energy source level thereby extending the useful life of the energy source and laser optics as well.

Furthermore, not only can the laser be operated at a higher energy output, but the energy output is more consistent. As mentioned above, in prior dye laser systems, the laser output diminishes continuously. However, with the present embodiment, the laser output is substantially constant and does not exhibit attenuation even after using the same dye and solvent far in excess of 1000 pulses. This eliminates the necessity associated with prior dye laser devices for adjusting the energy settings to compensate for dye degradation.

In the preferred embodiment, the dye laser used is a Candela Model LPDL (Long Pulse Dye Laser), however, other models of dye lasers can be readily used as well. Approximately 6 gm of dye is used to saturate the medium. The dye used is Rhodamine 575 or combination of other Rhodamine dyes commercially available from Exciton, Inc. However, other dyes, such as Kiton red, may be used as well. The dye is dissolved in approximately 17-20 liters of solvent in the LPDL Model. The solvent used is ethylene glycol and water obtainable commercially from American Scientific Products, Inc. Other solvents may also be suitable, such as methanol, water, DMSO, or other solvents capable of dissolving dye. In addition, 4-6 gm of COT, or an equivalent, may also added to the solvent, when necessary.

The circulation path may be formed of Teflon coated tubing. In a preferred embodiment, the tubing has an outer diameter of approximately 1.2 cm. The total length of the circulation path is approximately 20 feet with approximately 10 foot segments of the circulation path on each side of the laser cavity between it and the reservoir. These dimensions or the type of tubing are not considered critical and the circulation path may be comprised of tubing of different dimensions and have a length either longer or shorter.

In the preferred embodiment, the regeneration medium is a commercially available activated charcoal medium filter. Other media such an ion-exchange resin or a lipid/polar interface may also be suitable. The regeneration medium is located in the circulation path so that the dye solution passes through it, i.e. the circulation path is closed. The regeneration medium may be formed or retained in a hollow cylinder approximately 25 cm in length and having an inner diameter of approximately 3 cm and an outer diameter of 7 cm. If activated charcoal is used for the regeneration medium, there may also be provided a screen or mesh to hold the activated charcoal in place to form a cylindrical shaped regeneration medium element. An element so formed may be located in the circulation path in a housing large enough to contain the element. The dye solution is pumped via a portion of the circulation path into the inside of the cylindrical element and through the element to the outside thereof. After passing through the element, the dye solution proceeds from the housing and continues in the circulation path.

Although the precise chemical reaction is not determined, it is considered that the regeneration medium may act as an exchange media and/or dye reservoir allowing contaminants and excited states of the dye molecule to be trapped in the filter. Eventually, excited states of the dye revert back to the normal dye ground state. The regeneration medium is saturated with the dye relative to the desired concentration in solution i.e., it is in equilibrium, and also acts as a trap for impurities for which it is not saturated. The regeneration medium may supply dye to replace degraded dye and therefore maintain the concentration of dye in solution on an indefinite basis.

Existing dye laser systems may also be readily modified in accordance with another embodiment of the present invention. Existing dye lasers may include a circulation path including a reservoir, a pump, a bubble filter (optionally), and a laser cavity connected in series. The dye solution from the laser cavity is returned back to the reservoir. In some dye laser systems, a by-pass circuit communicates with the main circuit and may include a filter to remove impurities or to add additional solution to the main circuit. In accordance with this embodiment of the present invention, to retrofit an existing dye laser to provide improved laser output and reduce or eliminate the frequency of dye solution replacement, a regeneration medium having a saturated concentration of dye solution in it can be added in series with the reservoir and the laser cavity in the main circulation path or in a side bypass circuit. Upon preparation of an initial solution, the fresh dye and solvent may be mixed by circulating in the circulation system without pulsing of the laser for a period of time. After that, the modified dye laser system may be operated in the manner as it was previously or with even higher laser output, as described above, without the need for replacement of the dye solution at the previous intervals.

Although it is preferred to connect the regeneration medium and the laser cavity in series to the circulation path of the dye laser system so that the circulation path is a single, closed path, in another embodiment of the present invention, the regeneration medium may be adapted to systems having other configurations. For example, although it is considered preferable to circulate the dye solution through the regeneration medium in series with the cavity, it would be possible to achieve similar benefits with a configuration in which only a portion of the dye solution were circulated through the regeneration medium, e.g. a parallel configuration. In addition, it would be possible in accordance with an embodiment of the present invention to operate a recirculation system without the laser cavity in order to regenerate dye solution that has already been degraded in other dye laser devices.

Because the embodiment of the present invention removes the need for expensive and time-consuming dye solution replacement, dye lasers may be made more affordable and the use of dye lasers may be extended to additional fields or used more extensively in present fields. Embodiments of the present invention may find uses in various fields of medicine, manufacturing, the military, as well as other fields.

It is intended that the foregoing detailed description be regarded as illustrated rather than limiting and that it is understood that the following claims including all equivalents are intended to define the scope of the invention.

We claim:
1. A dye laser comprising:
an energy source;
a laser cavity for containing a dye solution and adapted to produce laser light in response to energy received from said energy source;
a circulation path for pumping dye solution to said laser cavity; and
a regeneration medium adapted to absorb impurities and containing dye in equilibrium with the dye solution, said regeneration medium located in said circulation path whereby dye in said recirculation path may be regenerated by circulation through said regeneration medium.

2. The dye laser apparatus of claim 1 in which said regeneration medium is composed of a material selected from a group consisting of: activated charcoal, an ion-exchange resin, and a lipid/polar interface.

3. The dye laser apparatus of claim 1 in which said dye is dissolved in a solvent selected from a group consisting of: ethylene glycol, methanol, water, ethanol and DMSO.

4. The dye laser apparatus of claim 1 further comprising:
a bubble filter located in said circulation path.

5. The dye laser of claim 1 in which said circulation path is a closed recirculation path.

6. The dye laser apparatus of claim 1 further comprising:
a reservoir connected to said circulation path.

7. The dye laser apparatus of claim 1 further comprising:
a pump connected to said circulation path and operable to pump dye through said laser cavity and said regeneration medium.

8. The dye laser apparatus of claim 1 in which said regeneration medium comprises a charcoal filter saturated with dye.

9. The dye laser apparatus of claim 1 in which said regeneration medium includes a quantity of dye therein substantially in excess of the quantity of dye in the dye solution in the rest of the circulation path.

10. The dye laser apparatus of claim 9 in which said regeneration medium contains approximately twelve times the amount of dye contained in the dye solution in the rest of the circulation path.

11. The dye laser apparatus of claim 10 in which said regeneration medium contains approximately 5½ grams of dye and the dye solution in the rest of the circulation path contains approximately 400 mg of dye.

12. An improved dye laser system comprising:
a laser cavity for containing a dye solution and adapted to produce laser light in response to an energy source;
a closed recirculation path for drawing dye in solution through said laser cavity; and
a regeneration medium saturated with dye in equilibrium with the dye solution in said recirculation path, said regeneration medium located in said closed circulation path whereby dye in said recirculation path may be regenerated by circulation through said regeneration medium.

13. The improved dye laser system of claim 12 in which said regeneration medium is composed of a material selected from a group consisting of: activated charcoal, an ion-exchange resin, and a lipid/polar interface.

14. The improved dye laser system of claim 12 in which the dye is dissolved in a solvent selected from a group consisting of: ethylene glycol, methanol, water, ethanol, and DMSO.

15. The improved dye laser system of claim 12 further comprising:
a bubble filter located in said circulation path.

16. The improved dye laser system claim 12 further comprising:
a reservoir connected to said circulation path.

17. The improved dye laser system of claim 12 further comprising:
a pump connected to said circulation path and operable to pump dye through said laser cavity and said regeneration medium.

18. The improved dye laser system of claim 12 in which said regeneration medium comprises a filter saturated with dye at a concentration in equilibrium with the dye concentration in the closed recirculation path.

19. In a dye laser system having a laser cavity for containing a dye solution and adapted to produce laser light in response to excitation from an energy source, a source of dye solution, and a circulation path connecting the source of dye solution to the lasing cavity, an improvement comprising:
a regeneration medium containing a saturated concentration of dye and located in the circulation path whereby dye in the circulation path may be regenerated by circulation through said regeneration medium.

20. The dye laser system of claim 19 in which said regeneration medium comprises a filter selected from a group consisting of: activated charcoal, an ion-exchange resin, and a lipid/polar interface.

21. A system for restoring dye solution degraded by use in dye laser comprising:
a circulation path for conveying the dye solution;
a pump connected to said circulation path and operable to pump the dye solution; and
a regeneration medium adapted to absorb impurities and connected to said circulation path, said regeneration medium containing dye at a saturated concentration whereby the dye solution in said recirculation path may be regenerated by circulation through said regeneration medium.

22. The system of claim 21 in which said regeneration medium comprises a filter containing a dye solution at a saturated concentration.

23. A method for operating a dye laser comprising the steps of:
circulating a dye solution through a laser cavity for containing a dye solution and adapted to produce laser light in response to excitation from an energy source; and
circulating the dye solution from the laser cavity through a regeneration medium in which the dye solution is maintained in a saturated concentration whereby the dye solution in the recirculation path may be regenerated by circulation through the regeneration medium.

24. A method for restoring a dye solution degraded in use in a dye laser comprising the step of:
providing a regeneration medium sized and adapted to retain a quantity of dye and allow flow therethrough of solvent and dye in excess of said quantity;
circulating the dye solution from the laser cavity through a circulation path having the regeneration medium located therein in which the dye is at a saturated concentration in equilibrium with the concentration of the dye solution in the circulation path whereby the dye solution may be regenerated by circulation through the regeneration medium.

25. A method of modifying a dye laser system having a circulation path for providing a dye solution to a laser cavity comprising the step of:
connecting a regeneration medium having a saturated concentration of dye solution to the circulation path so that the dye solution passes through both the laser cavity and the regeneration medium whereby the dye solution can be regenerated by circulation through the regeneration medium.

26. The method of claim 25 further comprising:
circulating the dye solution through the laser cavity and the regeneration medium and back to the laser cavity.

27. The method of claim 25 in which the circulating step further comprises:
circulating the dye solution in a closed path.

* * * * *